Feb. 16, 1965    D. J. HERRINGTON    3,169,761
THREAD VISE
Filed Aug. 20, 1962    2 Sheets-Sheet 1
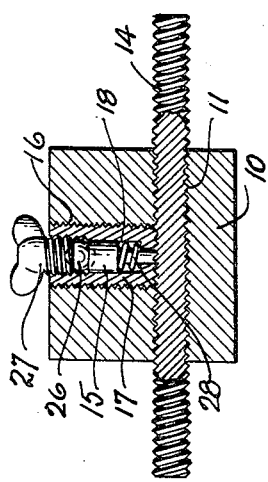
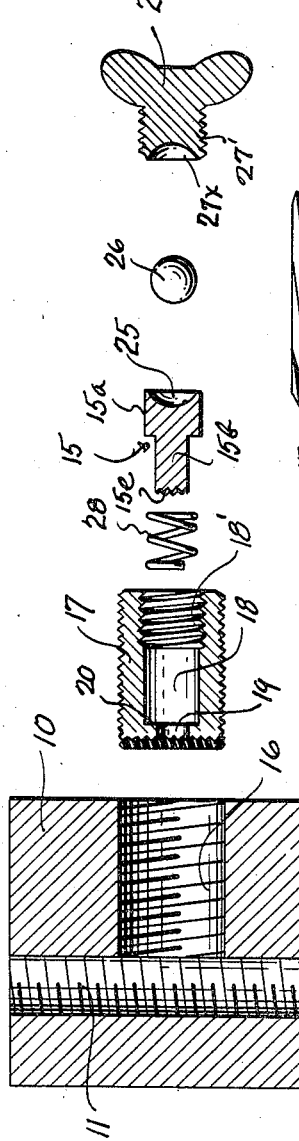
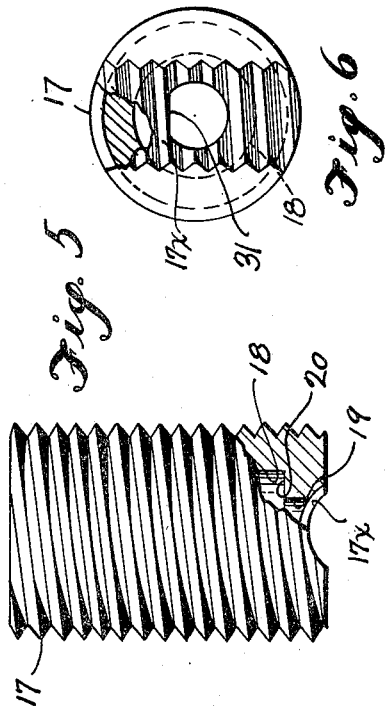
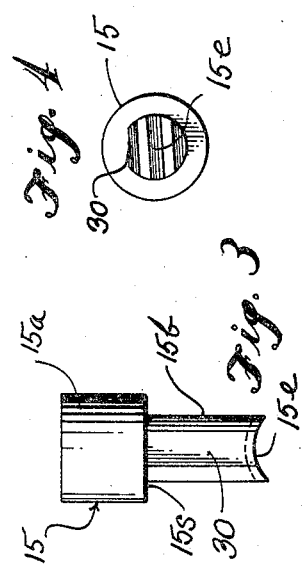
INVENTOR.
DONALD J. HERRINGTON
BY
Robinson & Perry
ATTORNEYS Feb. 16, 1965  D. J. HERRINGTON  3,169,761
THREAD VISE
Filed Aug. 20, 1962  2 Sheets-Sheet 2
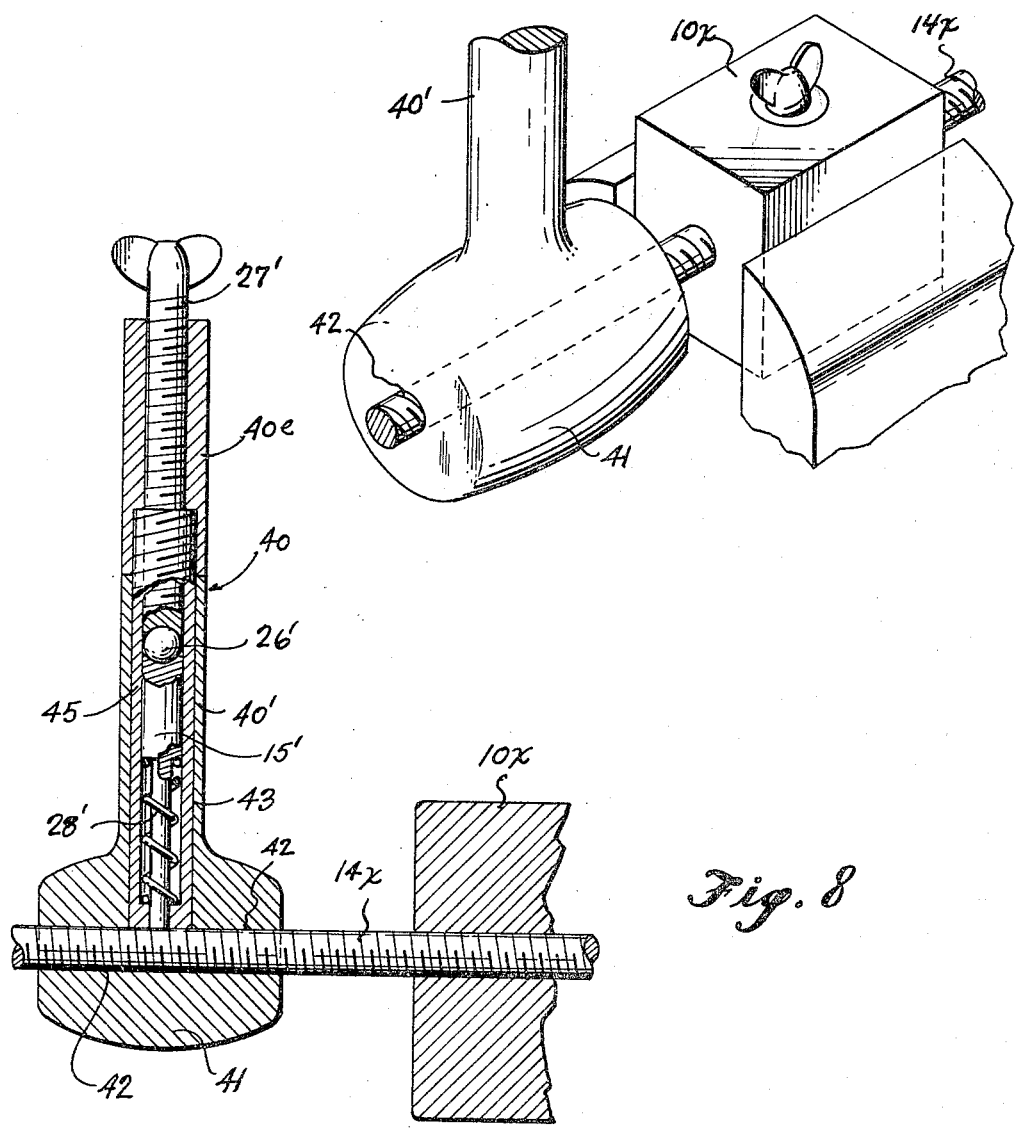
INVENTOR.
DONALD J. HERRINGTON
BY
Robinson & Berry
ATTORNEYS United States Patent Office 3,169,761
Patented Feb. 16, 1965

3,169,761
THREAD VISE
Donald J. Herrington, 5230 S. Dawson St.,
Seattle 18, Wash.
Filed Aug. 20, 1962, Ser. No. 218,491
2 Claims. (Cl. 269—248)

This invention relates to rod holding clamps. More particularly, it relates to an improved form of holding clamps for threaded and otherwise machined rods, stud bolts and the like, for their securement against turning while being rethreaded or machined, and without causing damage to the threaded or machined surfaces thereof.

It relates further to a rod holding clamp embodied in the head portion of a lever arm designed for use in the removal of threaded rods from blocks or parts in which they have become "frozen," as for example, by rust or expansion.

It is the principal object of this invention to provide a holding clamp of the character and for the purposes above stated that is easy to apply; effective in its use and which avoids any damage to the surfaces or threads of the clamped piece by reason of pressure of the clamping members thereagainst.

It is also an object of this invention to provide a rod holding clamp having the advantages as above stated, embodying a block or body portion through which the rod or piece to be gripped or held may be passed for its engagement by clamping means therein including a pin guiding and holding sleeve, and a pin that is contained in said sleeve and which pin is formed with an arcuate, threaded end surface designed to fit the engaged portion of the threaded rod without causing damage to its threads and which pin may be actuated into and from clamping contact with the rod by the manual adjustment of a wing bolt that is threaded into the pin mounting and guiding sleeve.

Further objects and advantages of the invention reside in the details of construction of the several parts that make up the presently described tools; in the assembly of their parts and in the manner of their use as hereinafter described.

In accomplishing the above mentioned and other objects and advantages of the invention that will be disclosed as the specification progresses, I have provided the improved details of construction, the preferred forms of which are illustrated in the accompanying drawings, wherein:

FIG. 1 is a longitudinal sectional view of the present rod clamp with a threaded rod held therein.

FIG. 2 is a similar sectional view of the parts of the tool, but showing them substantially enlarged and in separated relationship for explanatory purposes.

FIG. 3 is an enlarged side view of the clamping pin of the tool.

FIG. 4 is an inner or lower end view of the clamping pin as seen in FIG. 3.

FIG. 5 is an enlarged side view of the pin mounting and guiding sleeve, with a part broken away for explanatory purposes.

FIG. 6 is an inner end view of this pin guiding sleeve of FIG. 5.

FIG. 7 is a perspective view showing a tool of a character like that of FIG. 1 as designed for use with a rod turning lever arm.

FIG. 8 is a longitudinal section of the lever arm of FIG. 7 as applied in use.

Referring more in detail to the drawings:

This tool of this invention, as seen in FIG. 1, is designed as an effective and satisfactory mounting for a threaded shaft, stud bolt or rod to hold it against turning while being rethreaded or otherwise machined. Furthermore, the invention is designed to provide a rod mounting body or block that may be secured in a vise, or the like, to hold the secured rod for machining.

In its present preferred form, the rod mounting body or block of the tool, designated by numerals 10, is of metal and in rectangular form of predetermined dimensions. It might be square, hexagonal, or octagonal in cross-section and formed lengthwise with a threaded bore 11 therethrough. This bore is of a diameter designed to accommodate the threaded rod, stud bolt or shaft that is to be held for machining or other work thereon.

In FIG. 1, the rod to be machined or threaded is designated by numeral 14. It might be one of substantial length or it might be a short stud or shaft that could be threaded into the body 10 in the same manner as shown.

To clamp and hold the rod 14 or stud against turning in the mounting body 10, I have applied a clamping pin 15 within the body 10 as shown in FIG. 1 wherein it is noted that a threaded bore 16 leads into the body from one side surface thereof. This bore 16 opens into the body bore 11 at a right angle. Threaded into the bore 16 and extended to its full depth, is a tubular pin guiding and mounting sleeve 17. This sleeve is formed from its outer end with an axial bore 18 which is threaded for a short distance along its outer end portion, as at 18' and near its inner end terminates in a short portion 19 of reduced diameter that provides the bore near that end with an annular internal shoulder or ledge 20 shown best in FIG. 5.

The clamping pin 15, as is well shown in FIG. 3 has a cylindrical outer end head portion 15a that is received in and slidably fitted in the bore below the threads 18'. It also has a diametrically reduced inner end portion 15b that passes slidably through the reduced inner end portion 19 of bore 18 and is adapted to bear in clamping contact at its end against the rod 14. The inner end surface of clamping pin 15 is cylindrically cupped as in FIG. 3 to fit the curvature of the rod 14 and also is formed in that end surface with threads 15e, see FIGS. 3 and 4, designed to engage in mesh with threads of the rod 14.

At its outer end the head portion of pin 15 has a spherically shaped ball seat 25 formed therein in which a ball bearing 26 is seated, as in FIG. 1, and threaded into the outer end portion of the bore 18 of sleeve 17 is a wing bolt 27 that has the inner end surface of its threaded shank 27' spherically cupped as at 27x in FIG. 2 to fit the surface of the ball bearing 26.

A coil spring 28 is applied about the reduced inner end portion of the pin 15 and seats under compression at one end against the upwardly facing ledge 20 of the sleeve 17 and at its other end seats against the downwardly facing annular shoulder 15s of the pin 15, see FIG. 3, to urge the pin outwardly with the outward adjustment of the wing bolt.

It is to be understood that the parts of the clamp are applied, as shown in FIG. 1, to the threaded bore 16 and extended slightly into the bore containing rod 14. However, the bore 11 that contains the rod is not internally threaded until after the sleeve and pin are properly assembled and applied to cause their inner ends to extend into bore 11. The threading of the bore 11 then forms the pin end with its end threads 15e and forms the inner end of sleeve 17 with threads as at 17x in FIGS. 5 and 6.

It is desirable that the pin 15 shall be held against axial rotation in its guide sleeve in order that the threads on its inner end surface may be caused to be properly meshed with threads of the rod 14. This is accomplished by forming the reduced inner end portion of the pin with a longitudinally extending flattened surface 30 along one side and providing the reduced inner end portion 19 of the sleeve bore with a similarly flattened side as at 31 in FIG. 6 so that when the pin is properly contained in the sleeve, it cannot turn from thread meshing position but can be adjusted inwardly and outwardly incident to adjustment of the wing bolt.

With the several parts of the clamp so assembled, a rod 14 threaded through the body 10 can be held against turning in the body by the inward pressure of the clamping pin against it; this clamping pressure being applied by a manual inward adjustment of the wing bolt 27 against the ball bearing 26 as seated against the outer end surface of the pin. The ball bearing facilitates an easy adjustment of the parts.

Clamping devices of this character may be made in various sizes to accommodate threaded stud bolts, rods, or shafts, and when the tool is applied to such rod or bolt it may be applied to a vise and held secure therein for the rethreading, key forming or other machining of the rod without damage.

Bodies 10 of this kind would be provided with longitudinal bores of various diameters, threaded to receive rods of various diameters. The body 10 has flat sides so that it may be readily held in a bench vise or other convenient holding means when in use.

The device that has been illustrated in FIGS. 7 and 8 is intended primarily as a means for removing studs or shafts that have become locked by rust or for other reasons, in a block or piece of metal. This device comprises clamping parts corresponding to those shown in FIG. 1, but of different proportions.

In these views 10x designates what may be a block in which a rod 14x is tightly threaded and locked by rust, corrosion or expansion. The lever arm of this device, designated in its entirety by numeral 40 comprises the rigid lever arm 40' that is formed with a head 41 at one end, through which a bore 42 is formed to receive the rod 14x. The lever arm is formed with a longitudinal bore 43 opening at its inner end to bore 42. Threaded into bore 43 is an externally threaded sleeve 45 that terminates at its inner end, at the bore 42. This sleeve, at its outer end mounts an arm extension 40e. The arm and its extension contain parts corresponding to the parts contained in sleeve 17 of the device of FIG. 1 and their operation or use to lock the arm against turning about the shaft 14x is the same as the corresponding parts lock the shaft 14 in block 10. In FIG. 8 parts that correspond primed reference numerals. to parts of like character in FIG. 1 are given the same but

What I claim is:

1. A vise for holding a rod for re-threading, comprising a body block that is adapted to be fixedly held and which is formed with a threaded, longitudinal bore for containing the rod for re-threading and formed also with a lateral bore directed into said block and opening into said longitudinal bore at a right angle thereto, a cylindrical sleeve threaded into the lateral bore; said sleeve being internally threaded along its outer end portion and formed with a smooth bore beyond said threaded portion extending to near its inner end and defining an outwardly facing shoulder and a bore of smaller diameter coaxial of the smooth bore and opening to the inner end of the sleeve, a rod clamping pin slidably contained in the smooth bore of said sleeve with its inner end portion extending through said bore of smaller diameter into holding engagement with a rod that is contained in said longitudinal bore of the body block and a clamping screw threaded into the threaded outer end portion of the sleeve to engage against the outer end of said clamping pin to force it against said rod to hold it against turning in the block.

2. A rod re-threading vise according to claim 1 wherein the inner end surface of said clamping pin is shaped to fit the cylindrical curvature of the rod and threads are formed on the end surface thereof to intermesh with the threads of the rod, and said pin is formed about its outer end portion with a shoulder, and a coiled spring is held under compression about the pin between the shoulders of sleeve and pin to automatically unseat the pin from the rod with outward adjustment of the clamping screw.

References Cited by the Examiner
UNITED STATES PATENTS

| | | | |
|---|---|---|---|
| 215,836 | 5/79 | Rhines | 151—24 |
| 602,120 | 4/98 | Wright | 151—24 |
| 869,086 | 10/07 | Hoffman | 287—52.08 X |
| 973,640 | 10/10 | Dunkle et al. | 151—24 X |
| 1,008,424 | 11/11 | McKinney et al. | |
| 1,289,167 | 12/18 | Hatten | 151—24 |
| 2,974,965 | 3/61 | Welles | 151—24 X |

ROBERT C. RIODON, *Primary Examiner.*